United States Patent
Nagai et al.

(10) Patent No.: US 11,422,767 B2
(45) Date of Patent: Aug. 23, 2022

(54) PLAYBACK SYSTEM, VIBRATOR, AND PLAYBACK SYSTEM CONTROL METHOD

(71) Applicant: YAMAHA CORPORATION, Hamamatsu (JP)

(72) Inventors: Hisashi Nagai, Hamamatsu (JP); Kazuhiko Nishizawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/554,737

(22) Filed: Aug. 29, 2019

(65) Prior Publication Data

US 2019/0384564 A1    Dec. 19, 2019

Related U.S. Application Data

(63) Continuation of application No. PCT/JP2018/007672, filed on Mar. 1, 2018.

(30) Foreign Application Priority Data

Mar. 3, 2017   (JP) ............................. JP2017-040606
Mar. 3, 2017   (JP) ............................. JP2017-040607

(51) Int. Cl.
*G11B 17/028*    (2006.01)
*G06F 3/16*    (2006.01)
(Continued)

(52) U.S. Cl.
CPC .............. *G06F 3/165* (2013.01); *G08B 6/00* (2013.01); *G08C 17/02* (2013.01); *G11B 20/10527* (2013.01)

(58) Field of Classification Search
CPC . G06F 3/16; G06F 3/162; G06F 3/165; G06F 3/167; G06F 3/04847; G08B 6/00;
(Continued)

(56) References Cited

U.S. PATENT DOCUMENTS

2002/0172107 A1* 11/2002 Yamada ............... G11B 27/005
                                                      369/30.26
2004/0085291 A1   5/2004 Yamada
(Continued)

FOREIGN PATENT DOCUMENTS

JP    2000194339 A    7/2000
JP    2004088259 A    3/2004
(Continued)

OTHER PUBLICATIONS

International Search Report issued in Intl. Appln. No. PCT/JP2018/007672 dated May 29, 2018. English translation provided.
(Continued)

*Primary Examiner* — Thomas H Maung
(74) *Attorney, Agent, or Firm* — Rossi, Kimms & McDowell LLP

(57) ABSTRACT

A playback system includes a playback controller that causes a sound outputter to play a sound in accordance with an operation made by a user to an operator that is operated while the user is in contact with the operator; and a vibration imparter that vibrates the operator in accordance with a vibration signal that corresponds to the sound.

8 Claims, 7 Drawing Sheets

(51) Int. Cl.
*G08B 6/00* (2006.01)
*G08C 17/02* (2006.01)
*G11B 20/10* (2006.01)

(58) Field of Classification Search
CPC . G11B 19/02; G11B 27/034; G10H 2210/241
See application file for complete search history.

(56) References Cited

U.S. PATENT DOCUMENTS

| | | | |
|---|---|---|---|
| 2005/0111319 A1 | 5/2005 | Usui et al. | |
| 2006/0255683 A1* | 11/2006 | Suzuki | G05G 5/03 |
| | | | 310/317 |
| 2007/0079315 A1 | 4/2007 | Mittersinker | |
| 2008/0110970 A1 | 5/2008 | Kataoka | |
| 2008/0165141 A1* | 7/2008 | Christie | G06F 3/0482 |
| | | | 345/173 |
| 2010/0014390 A1* | 1/2010 | Flum | G11B 19/02 |
| | | | 369/4 |
| 2010/0216547 A1* | 8/2010 | Coppard | A63F 13/245 |
| | | | 463/31 |

FOREIGN PATENT DOCUMENTS

| | | |
|---|---|---|
| JP | 2005158099 A | 6/2005 |
| JP | 2005182932 A | 7/2005 |
| JP | 2009512105 A | 3/2009 |
| WO | 2006068114 A1 | 6/2006 |
| WO | 2007044177 A2 | 4/2007 |

OTHER PUBLICATIONS

Written Opinion issued in Intl. Appln. No. PCT/JP2018/007672 dated May 29, 2018.
Office Action issued in Japanese Appln. No. 2019-503093 dated May 12, 2020. English machine translation provided.

\* cited by examiner

PLAYBACK SYSTEM, VIBRATOR, AND PLAYBACK SYSTEM CONTROL METHOD

CROSS REFERENCE TO RELATED APPLICATIONS

This application is a Continuation Application of PCT Application No. PCT/JP2018/007672, filed Mar. 1, 2018, and is based on and claims priority from Japanese Patent Application No. 2017-040606, filed Mar. 3, 2017, and Japanese Patent Application No. 2017-040607, filed Mar. 3, 2017, the entire contents of which are incorporated herein by reference.

BACKGROUND

Technical Field

The present disclosure relates to a technology for playing sounds.

Background Information

Various technologies for playing sounds have been proposed in related arts. For example, Japanese Patent Application Laid-Open Publication No. 2004-88259 (hereafter, JP 2004-88259) discloses a technology for changing a playback position of a sound represented by music data recorded on an optical disc in accordance with an operation made by a user to a disk-shaped rotatable operation device.

In the technology of JP 2004-88259, a sound corresponding to a playback position can only be perceived aurally, which causes a problem of poor operational feel for a user.

SUMMARY

In consideration of the above circumstances, an object of the present disclosure is to enable a user to tactually sense a playback sound.

In order to solve the above problem, a playback system according to an aspect of the present disclosure includes at least one processor; and a memory coupled to the at least one processor for storage of instructions executable by the processor, upon execution of which the processor is caused to cause a sound outputter to play a sound in accordance with an operation made by a user to an operator that is operated while the user is in contact with the operator; and a vibration imparter that vibrates the operator in accordance with a vibration signal that corresponds to the sound.

A vibrator according to an aspect of the present disclosure includes a communicator that receives a vibration signal that accords with a part within a sound signal corresponding to a playback point that changes in accordance with an operation made to an operator, wherein the operator is operated by a user while the user is in contact with the operator; and a vibration imparter that vibrates the operator in accordance with the vibration signal received by the communicator.

A playback system control method according to an aspect of the present disclosure includes causing a sound outputter to play a sound in accordance with an operation made by a user to an operator that is operated while the user is in contact with the operator; and vibrating the operator in accordance with a vibration signal that corresponds to the sound.

DESCRIPTION OF THE EMBODIMENTS

First Embodiment

Figure 1:
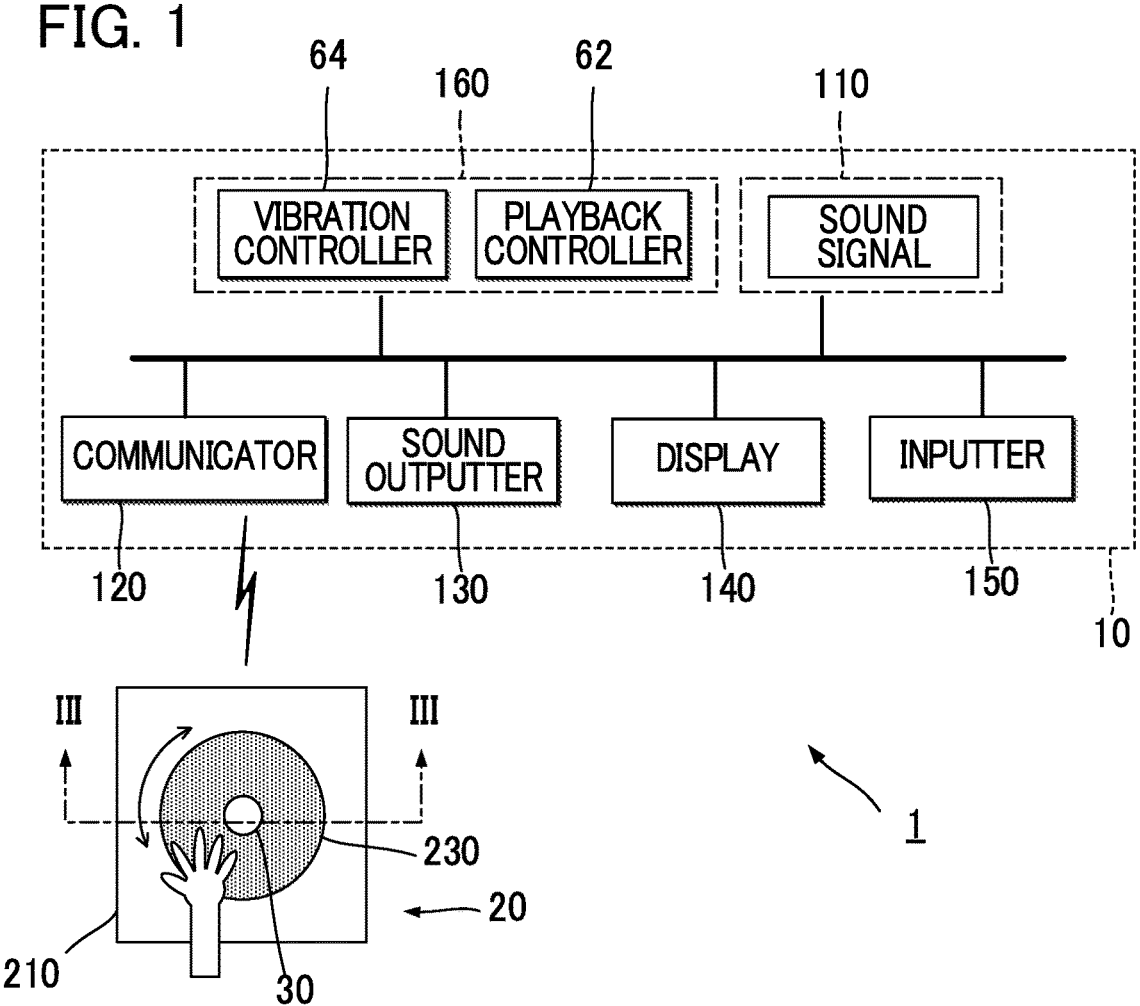
FIG. 1 is a configuration diagram of a playback system according to a first embodiment of the present disclosure.

FIG. 1 is a block diagram of a playback system 1 according to a first embodiment of the present disclosure. The playback system 1 of the first embodiment is, for example, a computer system that plays a piece of music, and is installed at a variety of event venues such as clubs or live houses. A user of the playback system 1 is, for example, a disc jockey (DJ).

As shown in FIG. 1, the playback system 1 according to the first embodiment includes a control system 10, an operation device 20, and a vibration device 30. The operation device 20 is operated by the user to change a time point (hereafter, a "playback point") P to be played on a time axis in a piece of music that is played by the control system 10. In other words, the playback point P can be changed by an operation made to the operation device 20 (an operator 230). The vibration device 30 is a device that causes the user to tactually perceive as vibration the sound played by the control system 10. Details of the operation device 20 and the vibration device 30 are described later.

The control system 10 controls playback of a piece of music and vibration of the vibration device 30 in accordance with an instruction from the user. For example, a portable information terminal such as a smartphone, a tablet terminal, or a personal computer may be used as the control system 10. The control system 10 is connected to each of the operation device 20 and the vibration device 30 either by wire or wirelessly. In the first embodiment, the control system 10 is connected to each of the operation device 20 and the vibration device 30 by short-range wireless communication such as Bluetooth (registered trademark) or Wi-Fi (registered trademark).

As shown in FIG. 1, the control system 10 includes a storage device 110, a communicator 120, a sound outputter 130, a display 140, an inputter 150, and a controller 160. The storage device 110 stores a computer program for execution by the controller 160, and a variety of data (for example, sound signals) for use by the controller 160. A sound signal represents a time waveform of a sound (for example, a singing sound or an instrumental playing sound) produced by playing a piece of music. A known recording medium such as a semiconductor recording medium may be freely adopted as the storage device 110. A recording medium externally detachable from the control system 10 may be used as the storage device 110. The communicator 120 is equipment used for communication with the operation device 20 and the vibration device 30.

The sound outputter 130 (for example, a speaker) reproduces a piece of music in accordance with a sound signal supplied from the controller 160 (a playback controller 62). That is, the sound outputter 130 emits sound waves through air causing the air to vibrate and music to be reproduced in accordance with the emitted sound waves. It is of note that a sound outputter 130 externally attached to the control system 10 or a sound outputter 130 communicable with the control system 10 may be used for playback of a piece of music. In other words, the sound outputter 130 and the control system 10 may be separate or integrated. The display 140 is, for example, a liquid crystal display panel, and displays various images under instruction from the controller 160. Specifically, the display 140 displays a waveform of a sound signal of a piece of music to be played.

The inputter 150 is operation equipment that is operated by the user for indication of a variety of instructions to the control system 10, and includes, for example, operators that are operated by the user. It is of note that a touch panel configured integrally with the display 140 may be adopted as the inputter 150. The inputter 150 receives from the user, for example, instructions to start and end playback of a piece of music.

The controller 160 executes a computer program stored in the storage device 110 to realize functions (the playback controller 62 and a vibration controller 64) for controlling playback of a piece of music and vibration of the vibration device 30. It is of note that a configuration may be adopted by which some of the functions of the controller 160 are realized by use of dedicated electronic circuitry, or by a configuration by which the functions of the controller 160 are distributed among devices.

The playback controller 62 causes the sound outputter 130 to play a piece of music. Specifically, the playback controller 62 causes the sound outputter 130 to play a sound represented by a part within the sound signal of the piece of music that corresponds to a playback point P (hereafter, a "playback part"). The playback part is a series of samples constituting the sound signal. The playback controller 62 according to the first embodiment moves the playback point P by a movement amount E on the time axis of the sound signal in a predetermined time period t (time t1, t2, t3, ... ) and supplies the playback part (that is, a part of the sound signal) corresponding to the moved playback point P to the sound outputter 130. The time period t is a much shorter period relative to a time length of a piece of music. The movement amount E per predetermined time period t changes depending on an operation made to the operation device 20, and remains constant when no operation is made to the operation device 20. When an operation is made to the operator 230, the playback point P changes depending on the operation. The operation made to the operator 230 is described later.

When the inputter 150 receives an instruction to start playback of a piece of music, the playback controller 62 moves the playback point P by the movement amount E0 on the time axis of the sound signal in each time period t from the beginning to the end of the piece of music (that is, forward on the time axis), where no operation is made to the operation device 20. The movement amount E0 remains constant. When the playback point P moves forward by the movement amount E0 in each time period t, the piece of music is played in a normal state (a state in which no fast forwarding, fast rewinding, or the like is performed). When an operation is made to the operation device 20, the playback controller 62 changes the playback point P on the time axis of the sound signal depending on the operation made to the operation device 20.

Figure 2:
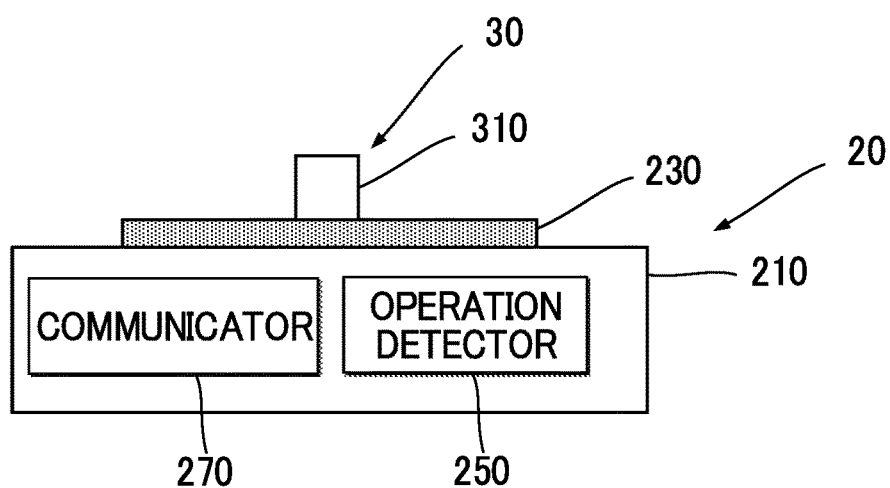
FIG. 2 is a cross-sectional view of an operation device in FIG. 1.

FIG. 2 is a cross-sectional view taken along line III-III of the vibration device 30 shown in FIG. 1. The operation device 20 is operated by the user to change the playback point P as described above and is, for example, a turntable. Specifically, as shown in FIG. 2, the operation device 20 includes a casing 210, an operator 230, an operation detector 250, and a communicator 270. The casing 210 is, for example, a hollow structure in the form of a cuboid. The operator 230 is installed on an upper surface of the casing 210, and the operation detector 250 and the communicator 270 are each accommodated in the casing 210.

As shown in FIG. 1, the operator 230 is an operator operated by a user to change the playback point P while the user is in contact with the operator 230. The operator 230 according to the first embodiment is a disk supported by the casing 210, and rotates in response to an operation made by the user. The operator 230 is rotatable in both a right (clockwise) direction and a left (counterclockwise) direction. To change the playback point P, the user may rotate the operator 230 in either direction and at any speed with her or his palm in contact with the surface of the operator 230. The operation made to change the playback point P may be, for example, DJ play such as scratching, and can be performed at any time point on the time axis of a piece of music. The rotational direction of the operator 230 corresponds to a direction of movement of the playback point P on the time axis of a piece of music (that is, on the time axis of the sound signal). Specifically, the operation for rotating the operator 230 clockwise corresponds to an operation (for example, fast forwarding) for moving the playback point P forward on the time axis (forward direction), and the operation for rotating the operator 230 counterclockwise corresponds to an operation (for example, fast rewinding) for moving the playback point P backward on the time axis (reverse direction).

Figure 3:
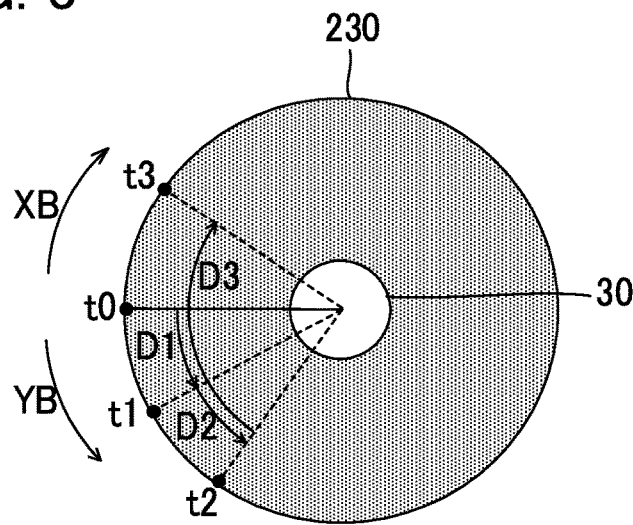
FIG. 3 is an illustrative diagram of operation information that is generated by an operation detector.

The operation detector 250 generates operation information depending on an operation made to the operator 230. Specifically, as shown in FIG. 3, the operation detector 250 generates operation information including a rotation amount D and a rotational direction (a clockwise direction XB or a counterclockwise direction YB) of the operator 230 at each time period t. The larger the rotation amount D in a time period t is, the faster the speed at which the operator 230 is rotated by the user. The operation detector 250 according to the first embodiment detects a detection signal representative of an operation made to the operator 230 and generates operation information from the detection signal. For generation of a detection signal, for example, a sensor, such as a rotary encoder, that optically detects the rotation of the operator 230 may be used. In FIG. 3 an example is shown of, during a period from time t0 to time t3, an operation for rotating the operator 230 clockwise XB made to the operator 230, subsequent to an operation made for rotating the operator 230 counterclockwise YB. In the example shown in FIG. 3, the operation detector 250 generates each of operation information including a rotation amount D1 and the counterclockwise direction YB at time t1, operation information including a rotation amount D2 and the counterclockwise direction YB at time t2, and operation information including a rotation amount D3 and the clockwise direction XB at time t3. It is of note that the rotation amount D3 is larger than the rotation amount D1 or the rotation amount D2 because the speed at which the operator 230 is rotated counterclockwise YB is faster than that at which the operator 230 is rotated clockwise XB.

The communicator 270 of the operation device 20 of FIG. 2 is equipment for communicating with the control system 10. Specifically, the communicator 270 sequentially transmits operation information generated by the operation detector 250 to the control system 10.

The communicator 120 of the control system 10 receives the operation information transmitted by the communicator 270 of the operation device 20. The playback controller 62 moves the playback point P on the time axis of the sound signal in accordance with the operation information received by the communicator 120. As described above, the operation information includes the rotational direction (XB or YB) and the rotation amount D of the operator 230. Specifically, the playback controller 62 moves the playback point P in the time period t by the movement amount E corresponding to the rotation amount D in the direction corresponding to the rotational direction. The playback point P moves forward on the time axis when the rotational direction is the clockwise direction XB, and moves backward on the time axis when the rotational direction is the counterclockwise direction YB. The larger the rotation amount D is, the larger the movement amount E is.

Figure 4:
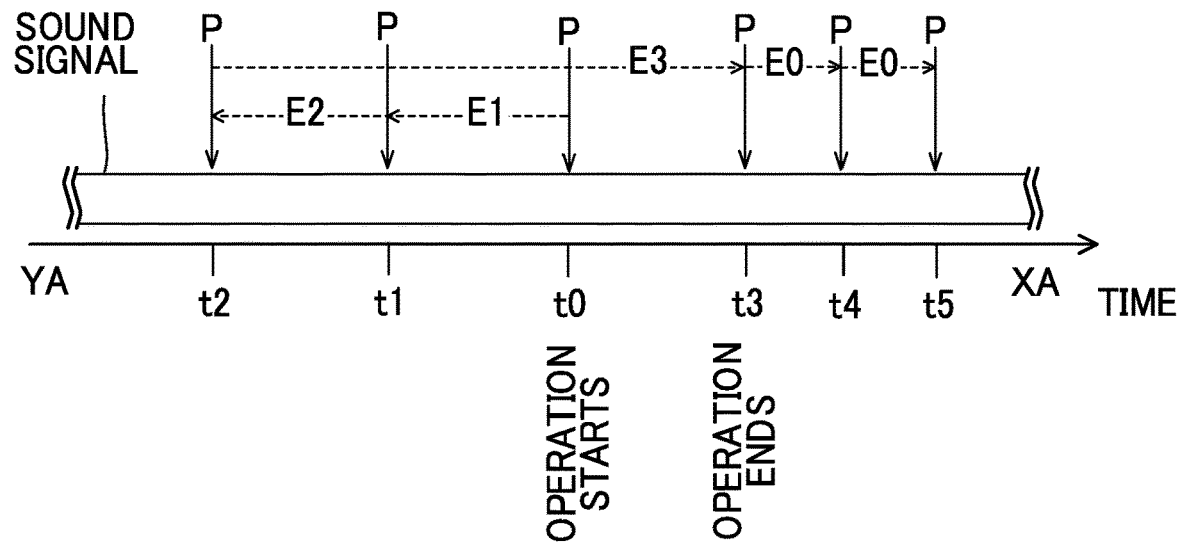
FIG. 4 is an illustrative diagram illustrating changes in a playback point on a time axis of a sound signal.

FIG. 4 is a diagram illustrative of changes in the playback point P on the time axis of the sound signal. In FIG. 4 it is assumed that changes in the playback point P occur when the communicator 120 receives operation information at each of time t1, time t2 and time t3 in the listed order. The rotational direction (the clockwise XB) of the operator 230 corresponds to forward XA on the time axis of the sound signal, and the rotational direction (the counterclockwise YB) of the operator 230 corresponds to backward YA on the time axis of the sound signal. As shown in FIG. 4, the playback controller 62 moves the playback point P backward YA by the movement amount E1 according to the rotation amount D1 from time t0 to time t1. The playback controller 62 moves the playback point P backward YA by the movement amount E2 according to the rotation amount D2 from time t1 to time t2. The playback controller 62 moves the playback point P forward XA by a movement amount E3 according to the rotation amount D3 from time t2 to time t3. It is of note that, as shown in FIG. 4, when the operation made to the operator 230 by the user ends at time t3, the playback controller 62 moves the playback point P by the movement amount E0 forward XA in the piece of music in each time period t (time t4, t5, . . . ) from the position of time t3. That is, the playback controller 62 returns to normal playback.

The sound outputter 130 of FIG. 1 outputs the sound represented by, within the sound signal, the playback part supplied from the playback controller 62. When no operation is made to the operator 230, that is, when the playback point P moves forward XA by the movement amount E0 in each time period t, the user senses that the piece of music is being played at a normal speed. In contrast, for example, when an operation is made for rotating the operator 230 clockwise XB, the user senses that the piece of music is being played quickly, faster than normal speed (that is, fast forwarding) in a case where the movement amount E is larger than the movement amount E0; and likewise senses that the music is being played slowly (that is, slow forwarding) in a case where the movement amount E is smaller than the movement amount E0. For example, in FIG. 4 since the movement amount E3 is larger than the movement amount E0, the user senses that the playback is being performed in a fast forward manner. As will be understood from the above description, the playback speed and the playback direction of a piece of music each change depending on an operation made to the operator 230.

The vibration controller 64 of FIG. 1 generates a signal (hereafter, a "vibration signal") that causes the operator 230 to vibrate in accordance with the playback part of the sound signal. The vibration controller 64 of the first embodiment generates as a vibration signal, the playback part of the sound signal that the playback controller 62 supplies to the sound outputter 130. The communicator 120 transmits the vibration signal generated by the vibration controller 64 to the vibration device 30.

The vibration device 30 vibrates depending on a sound within a piece of music, the sound corresponding to the playback point P. The vibration device 30 is placed on the surface of the operator 230 (for example, at the center of the surface of the operator 230), as shown in FIG. 2. Vibration of the vibration device 30 is transmitted to the operator 230. Since the user operates the operator 230 while in contact with the operator 230 on the surface of which the vibration device 30 is placed, the user can feel from the operator 230 the vibration of the vibration device 30.

Figure 5:
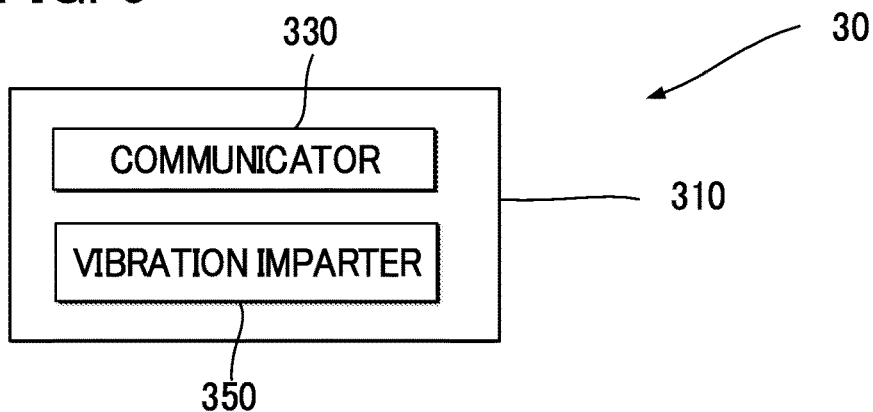
FIG. 5 is a block diagram of a vibrator.

Specifically, the vibration device 30 includes a casing 310, a communicator 330, and a vibration imparter 350, as shown in FIG. 5. The casing 310 is a hollow structure of a cylindrical form. The communicator 330 and the vibration imparter 350 are accommodated in the casing 310. The communicator 330 is equipment for communicating with the control system 10. Specifically, the communicator 330 receives a vibration signal transmitted by the control system 10.

The vibration imparter 350 vibrates the operator 230 in accordance with the vibration signal (that is, the playback part). Specifically, the vibration imparter 350 vibrates the casing 310 in accordance with the vibration signal received by the communicator 330 and vibrates the operator 230 on which the casing 310 (the vibration device 30) is placed. The larger the amplitude of the playback part is, the more strongly the casing 310 vibrates.

An actuator, such as an eccentric motor, a linear vibrator, or a piezoelectric element, may be used as the vibration imparter 350. The eccentric motor has an eccentric weight mounted to a rotation shaft of the motor. By supplying a vibration signal to the eccentric motor, a vibration depending on the playback part of the sound signal is generated in the casing 310. A linear vibrator is an actuator that displaces a movable body by generating a magnetic field through supply of power to a coil. By supplying a vibration signal to the coil of the linear vibrator, vibration depending on the playback part of the sound signal is generated in the casing 310. The piezoelectric element is a drive element in which a piezoelectric body is interposed between a pair of electrodes provided in opposing relation to each other. By supplying a vibration signal to one electrode of the piezoelectric element, vibration depending on the playback part of the sound signal is generated in the casing 310. It is of note that a battery (not shown) that supplies power to the vibration imparter 350 is provided in the casing 310. Power from the outside may be supplied to the vibration imparter 350.

The operator 230, on which the casing 310 is placed, vibrates in conjunction with vibration of the casing 310. Therefore, the user operating the operator 230 while in contact with the operator 230 feels vibration that accords with the playback part supplied to the sound outputter 130. As will be understood from the foregoing description, the user can sense the sound represented by the playback part not only aurally but also tactually from the sound output by the sound outputter 130.

Figure 6:
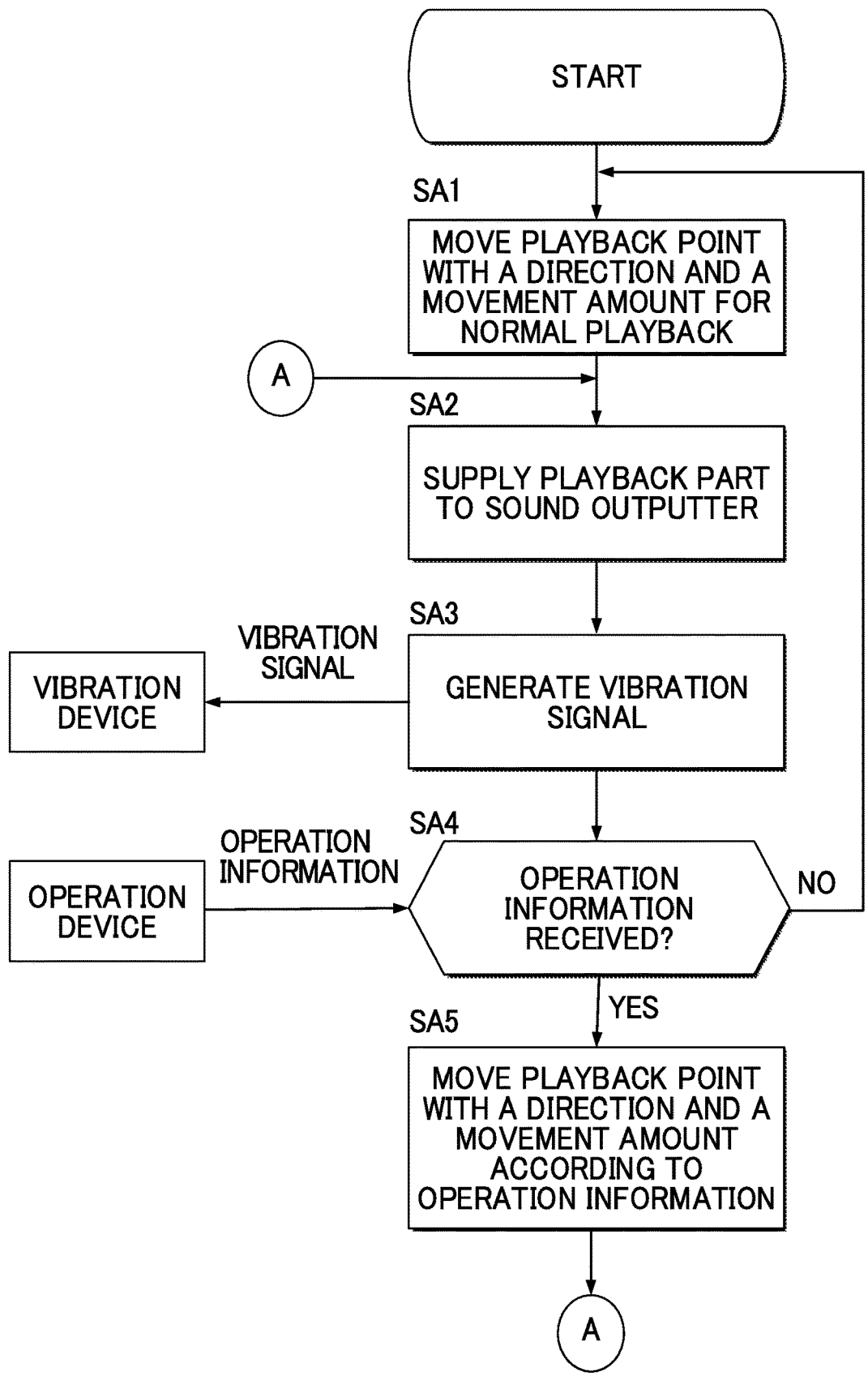
FIG. 6 is a flowchart illustrating a process performed by a controller of a control system.

FIG. 6 is a flowchart illustrating a process performed by the controller 160 of the control system 10. The process of FIG. 6 is started in response to an instruction from the user to play a piece of music. The playback controller 62 moves the playback point P by the movement amount E0 on the time axis of the sound signal from the beginning to the end of the piece of music (that is, forward XA on the time axis) (SA1). The playback controller 62 supplies the playback part corresponding to the playback point P moved in step SA1 to the sound outputter 130 (SA2). Steps SA1 and SA2 are normal playback processes (playback at a normal playback speed) of the piece of music. The vibration controller 64 generates a vibration signal based on the playback part that the playback controller 62 has supplied to the sound outputter 130 in step SA2 (SA3). Upon receiving the operation information (SA4; YES), the playback controller 62 moves the playback point P on the time axis of the sound signal in the direction (XA or YA) and the movement amount E in accordance with the operation information (SA5). When the process of step SA5 ends, the processes from step SA2 to step SA4 are repeated; that is, the piece of music is played in accordance with the operation made to the operator 230. When the playback controller 62 does not receive operation information (SA4; NO), the processes from step SA1 to step SA3 are repeated; that is, normal playback of the piece of music continues. It is of note that the process of FIG. 6 ends when an instruction to stop playing the piece of music is received from the user or when the playback ends at the end of the piece of music.

Second Embodiment

A second embodiment of the present disclosure will now be described. Elements of actions or functions that are the same as those of the first embodiment in each of the embodiments illustrated below are denoted by reference numerals used in the description of the first embodiment, and detailed description thereof is omitted as appropriate.

The operator 230 of the first embodiment is a disk supported by the casing 210, whereas in the second embodiment, there is used as an operator 230 a record V (i.e., an analog record) on which a sound signal of a piece of music is recorded. The playback controller 62 of the first embodiment supplies a sound signal stored in the storage device 110 to the sound outputter 130, whereas a playback controller 62 of the second embodiment supplies a sound signal recorded on the record V to a sound outputter 130.

Figure 7:
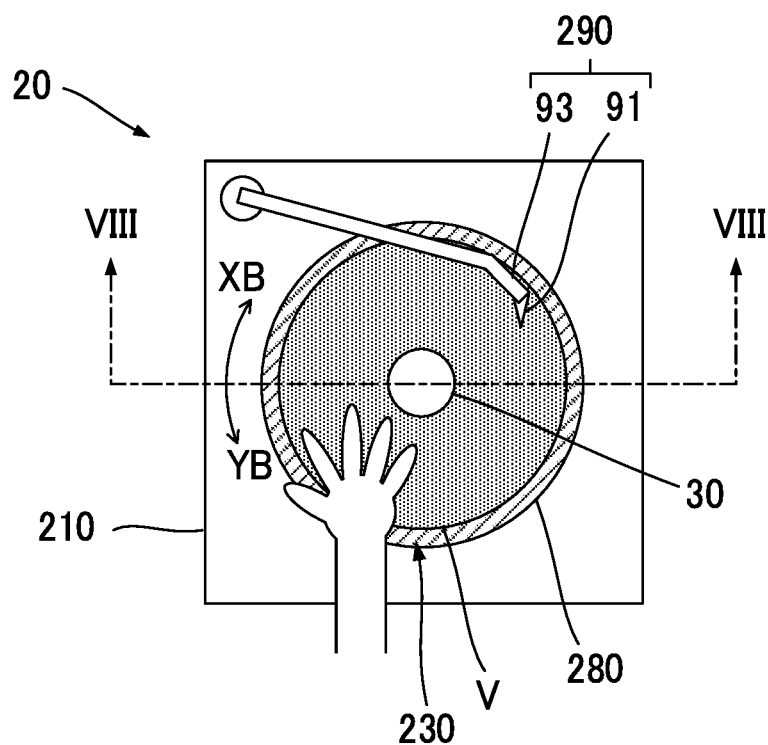
FIG. 7 is a configuration diagram of an operation device according to a second embodiment of the present disclosure.
Figure 8:
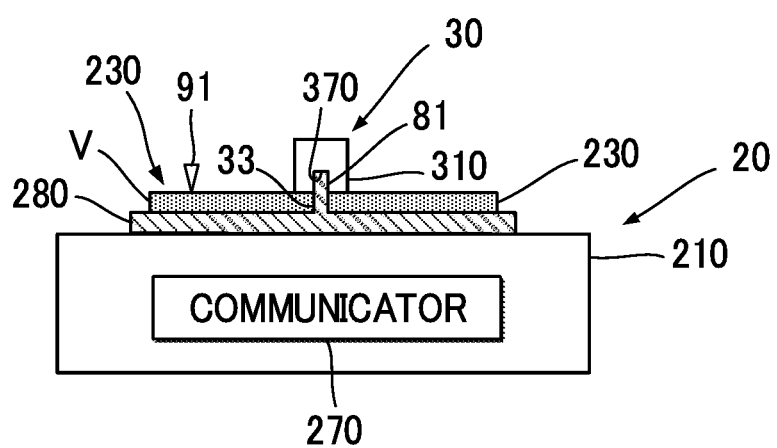
FIG. 8 is a cross-sectional view of the operation device in FIG. 7.

A playback system 1 according to the second embodiment includes a control system 10, an operation device 20, and a vibration device 30, as in the first embodiment. FIG. 7 is a block diagram of the operation device 20 according to the second embodiment, and FIG. 8 is a cross-sectional view taken along a line VIII-VIII in FIG. 7. The operation device 20 according to the second embodiment includes a casing 210, the record V (the operator 230), a communicator 270, a placement portion 280, and a detection device 290. The casing 210 is a hollow structure of, for example, a cuboid form, as in the first embodiment. The placement portion 280 and the detection device 290 are installed on a top surface of the casing 210, and the communicator 270 is accommodated in the casing 210. Specifically, the placement portion 280 is a disk that rotates the record V, and is supported by the casing 210. The record V is placed on the placement portion 280. For example, a platter rotated by a driving device (not shown), such as a motor, is adopted as the placement portion 280. A convex engaging portion 81 for insertion into the central hole 33 of the record V is arranged at the center of the surface of the placement portion 280, as shown in FIG. 8. The record V is placed on the surface of the placement portion 280 such that the engaging portion 81 is inserted into the central hole 33.

The sound signal of a piece of music is recorded on the record V of the second embodiment, as described above. Specifically, a groove portion (not shown) representative of a sound signal is formed on the surface of the record V. The groove portion is formed, for example, in a clockwise spiral shape commencing from an inner circumference to an outer circumference of the record V. The inner surface of the groove portion has a shape formed dependent on a waveform of the sound signal. The sound signal represented by the groove portion moves forward on the time axis from the outer circumference to the inner circumference of the record V. That is, a portion of the groove portion located on the outer circumferential side of the record V corresponds to the beginning of a piece of music, and a portion of the groove portion located on the inner circumferential side of the record V corresponds to the end of the piece of music.

The detection device 290 in FIG. 7 detects a sound signal recorded on the record V, and includes a detector 91 and a supporter 93. The detector 91 detects a playback part of the sound signal from the record V, and includes, for example, a record needle, and an electric circuit (not shown) that converts vibration of the record needle into an electric signal. Details of detection of the playback part in the detector 91 will be described later. The supporter 93 is an arm-like member, for example a tone arm, used for supporting the detector 91. One end of the supporter 93 is supported by the surface of the casing 210, and the other end supports the detector 91. The supporter 93 moves in both a horizontal direction and a vertical direction relative to the casing 210 around the end portion supported by the casing 210, which acts as the center. The user moves the supporter 93 to bring a tip of the detector 91 into contact with any point of the groove portion formed on the surface of the record V. The user performs an operation for instructing the inputter 150 to play a piece of music in a state in which the tip of the detector 91 is brought into contact with any portion of the groove portion of the record V placed on the placement portion 280.

When the inputter 150 receives an instruction to play a piece of music, the placement portion 280 starts to rotate in a clockwise direction at a constant speed. The record V placed on the placement portion 280 rotates in conjunction with rotation of the placement portion 280. A rotational speed and a rotational direction of the record V change depending on an operation made by the user to the record V, and remain constant when no operation is made by the user to the operation device 20 (that is, a speed and a rotational direction corresponding to the rotational speed of the placement portion 280).

The detector 91 when in contact with the groove portion of the record V moves along the groove portion as the record V rotates. In the second embodiment, a time point corresponding to a contact position of the detector 91 in the sound signal recorded on the record V is a "playback point P."

The detector 91 detects within the sound signal a playback part corresponding to the playback point P. It is of note that illustration of an A/D converter that converts the playback part detected by the detector 91 from analog to digital has been omitted for convenience.

When no operation is made to the record V, the playback point P continuously progresses forward on the time axis in accordance with the rotation of the placement portion 280. On the other hand, when an operation is made to the record V, the playback point P moves in accordance with the operation made. Further, when no operation is made to the record V, a piece of music is played normally.

The record V of the second embodiment is used as the operator 230 that is operated in a state in which the user is in contact with the operator 230 to change the playback point P. The record V of the second embodiment may rotate in either a clockwise direction or a counterclockwise direction depending on an operation made by the user, similarly to the operator 230 of the first embodiment. The user may rotate the record V in either direction and at any speed while her or his palm is in contact with the surface of the record V to change a position of contact of the detector 91 with the groove portion (that is, the playback point P). The playback part also changes in conjunction with the playback point P. A slip mat (not shown) for reducing friction between the record V and the placement portion 280 is placed between the record V and the placement portion 280. Therefore, when an operation is made to the record V, the placement portion 280 continues to rotate clockwise at a constant speed.

The direction of rotation of the record V corresponds to the direction of movement of the playback point P on the time axis of the sound signal, as in the first embodiment. Specifically, an operation for rotating the record V clockwise XB corresponds to an operation of moving the playback point P forward XA on the time axis, and the operation for rotating the record V counterclockwise YB corresponds to an operation of moving the playback point P backward YA on the time axis.

The rotational speed of the record V corresponds to a speed at which a contact position (that is, the playback point P) of the detector 91 moves. When the record V is rotated clockwise XB faster than the rotational speed of the placement portion 280, playback is performed at a speed that is faster than a normal speed (fast forward), and when the record V is rotated clockwise XB slower than the rotational speed of the placement portion 280, playback is performed at a speed that is slower than the normal speed (slow forwarding). It is of note that when an operation made by the user to the record V ends, the record V again rotates in accordance with the rotation of the placement portion 280; that is, rotation returns to a normal playback state.

The communicator 270 in FIG. 8 transmits the playback part of the sound signal recorded on the record V to the control system 10. The communicator 120 of the control system 10 of FIG. 1 receives the playback part transmitted by the operation device 20. The playback controller 62 according to the second embodiment causes the sound outputter 130 to play the sound represented by, within the sound signal, the playback part detected by the detector 91. Specifically, the playback controller 62 supplies within the sound signal the playback part supplied from the communicator 120 to the sound outputter 130. It is of note that, in actuality, the playback controller 62 of the second embodiment supplies the playback part to the sound outputter 130 after the playback controller 62 performs audio processing such as amplification or equalization of the playback part. The sound outputter 130 outputs the sound represented by the playback part, of the sound signal, supplied from the playback controller 62, as in the first embodiment.

The vibration controller 64 of the second embodiment generates a vibration signal depending on the playback part detected by the detector 91 of the sound signal. Specifically, the vibration controller 64 generates, as a vibration signal, the playback part of the sound signal that the playback controller 62 supplies to the sound outputter 130, as in the first embodiment. The communicator 120 transmits the vibration signal generated by the vibration controller 64 to the vibration device 30, as in the first embodiment.

As in the first embodiment, the vibration device 30 of FIG. 8 vibrates depending on a sound of a piece of music that corresponds to the playback point P, and includes a casing 310, a communicator 330, and a vibration imparter 350. However, as shown in FIG. 8, the casing 310 of the second embodiment has on its bottom surface a concave portion 370 that engages with the convex engaging portion 81 formed on the placement portion 280. In the vibration device 30 according to the second embodiment, the concave portion 370 formed in the casing 310 is detachably engageable with the engaging portion 81 of the placement portion 280, as shown in FIG. 8. Specifically, the vibration device 30 is placed on the surface of the record V such that the concave portion 370 of the casing 310 is engaged with the engaging portion 81 inserted into the central hole 33 of the record V. That is, the record V is sandwiched between the top surface of the placement portion 280 and the bottom surface of the casing 310.

The communicator 330 receives a vibration signal transmitted by the control system 10, as in the first embodiment. The vibration imparter 350 vibrates the record V (the operator 230) in accordance with the vibration signal (that is, the playback part), as in the first embodiment. Therefore, while operating the record V the user is in contact with the record V and can feel vibration depending on the playback part supplied to the sound outputter 130, as in the first embodiment.

Figure 9:
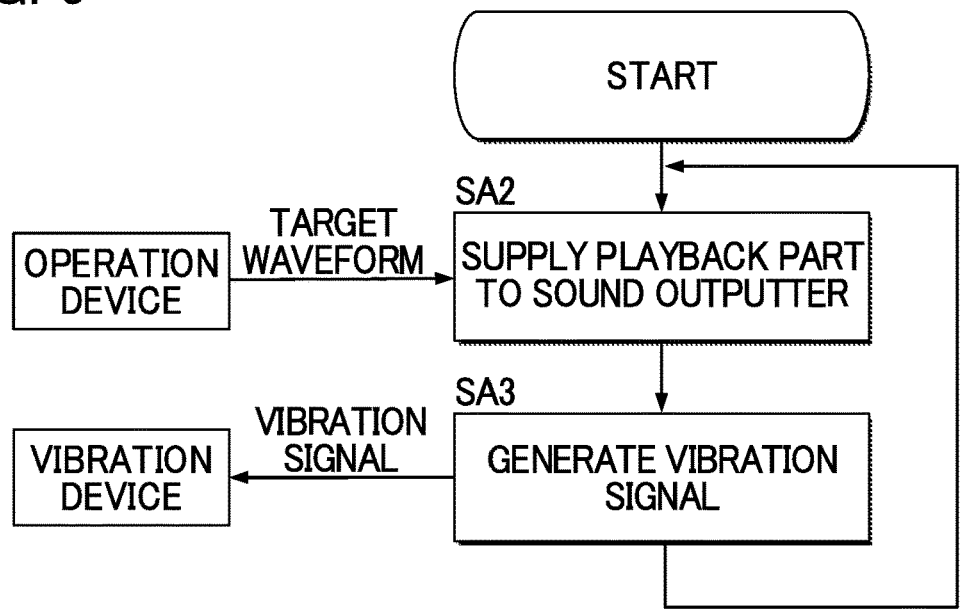
FIG. 9 is a flowchart illustrating a process performed by a controller of a control system.

FIG. 9 is a flowchart illustrating a process performed by the controller 160 of the playback controller 62 in the second embodiment. The process of FIG. 9 is started in response to an instruction made by the user to play a piece of music. The playback controller 62 supplies the playback part, of the sound signal, generated by the operation device 20 to the sound outputter 130, that is, causes the sound outputter 130 to play the sound represented by the playback part of the sound signal (SA2). It is of note that the operation device 20 generates the playback part in accordance with the rotation of the placement portion 280 or the operation made with respect to the record V. The vibration controller 64 generates a vibration signal from the playback part that the playback controller 62 has supplied to the sound outputter 130 in step SA2 (SA3). When the process of step SA3 ends, the process of step SA2 is repeated. It is of note that the process in FIG. 9 ends when an instruction to stop playing the piece of music is received from the user or when the playback ends at the end of the piece of music.

In the second embodiment, the same effects as those of the first embodiment are realized. In the second embodiment, particularly, since the placement portion 280 rotates in a state in which the record V is placed and acts as the operator 230, DJ style play of handling the record V can be maintained. Further, in the second embodiment, the casing 310 that accommodates the vibration imparter 350 is engaged with the convex engaging portion 81 formed at a center of the surface of the placement portion 280 and inserted into the central hole 33 of the record V. As a result, the convex engaging portion 81 inserted into the central hole 33 of the record V can be used for mounting the vibration imparter 350 (the casing 310), and the vibration imparter 350 can be easily mounted on the placement portion 280.

Third Embodiment

The operator 230 of the second embodiment is the record V, on which the sound signal of a piece of music has been recorded, whereas the operator 230 of a third embodiment is a record V (that is, a time code record) on which a signal representative of a series of time data (hereafter, a "time signal") has been recorded. The time data is information indicative of a time of each time point on the time axis, and corresponds to each time point on the time axis of the sound signal. The time signal recorded on the record V is not unique to a piece of music, and is the same in different pieces of music. It is of note that the time data is not limited to information indicative of the time of each time point on the time axis, and may be a freely-selected type of information as long as the time data is information by use of which each time point on the time axis of the sound signal can be specified (for example, a serial number is assigned to each time point on the time axis). The playback controller 62 of the second embodiment supplies the sound signal recorded on the record V to the sound outputter 130, whereas in the third embodiment, the sound signal stored in the storage device 110 is supplied to the sound outputter 130, as in the first embodiment.

A playback system 1 of the third embodiment includes a control system 10, an operation device 20, and a vibration device 30, as in the second embodiment. The operation device 20 according to the third embodiment includes a casing 210, a record V, a communicator 270, a placement portion 280, and a detection device 290, as in the second embodiment. The record V of the third embodiment is placed on the surface of the placement portion 280, such that an engaging portion 81 is inserted into a central hole 33, as in the second embodiment.

A groove portion (not shown) representative of a time signal is formed on a surface of the record V of the third embodiment. The groove portion is formed in, for example, a clockwise spiral shape commencing from the inner circumference to the outer circumference of the record V, as in the second embodiment. The inner surface of the groove portion of the third embodiment is formed in a shape depending on the time data represented by the time signal. The time signal represented by the groove portion advances forward on the time axis from an outer circumference to an inner circumference of the record V. That is, the time data indicated by the portion located on the outer circumferential side of the record V in the groove portion is backward in time, and the time data indicated by the portion located on the inner circumferential side of the record V in the groove portion is forward in time.

The detection device 290 of the third embodiment is equipment that detects a time signal recorded on the record V, and includes a detector 91 and a supporter 93, as in the second embodiment. The detector 91 according to the third embodiment is a detector for detecting time data indicative of the playback point P in the time signal and includes, for example, the record needle, and an electric circuit (not shown) that converts vibration of the record needle to an electrical signal, as in the second embodiment.

The placement portion 280 of the third embodiment starts to rotate clockwise at a constant speed when the inputter 150 receives an instruction to play a piece of music, as in the second embodiment. The record V placed on the placement portion 280 also rotates as the placement portion 280 rotates. The rotational speed and the rotational direction of the record V change depending on the operation made by the user to the record V, and remain constant (that is, a speed and a rotational direction corresponding to the rotational speed of the placement portion 280) when no operation is made to the operation device 20.

The detector 91 when it is in a state of being in contact with the groove portion of the record V moves along the groove portion as the record V rotates. The detector 91 of the third embodiment detects time data indicating the playback point P in the time signal, as described above.

When no operation is made to the record V, the time data (that is, the playback point P) detected by the detector 91 continuously progresses forward on the time axis in accordance with the rotation of the placement portion 280. When an operation is made to the record V, the time data detected by the detector 91 moves on the time axis of the time signal in accordance with the operation made.

The record V of the third embodiment is used as an operator operated by a user while in contact with the record V in order to change the playback point P, as in the second embodiment. The user operates the record V to change a contact position of the detector 91 with the groove portion (that is, the time data detected by the detector 91), as in the second embodiment.

The communicator 270 of the third embodiment transmits, to the control system 10, the time data detected by the detector 91 in the time signal recorded on the record V. The communicator 120 of the control system 10 receives the time data transmitted by the operation device 20. The playback controller 62 according to the third embodiment causes the sound outputter 130 to play the sound represented by the playback part corresponding to the playback point P indicated by the time data detected by the detector 91, the playback part being a part of the sound signal stored in the storage device 110. Specifically, the playback controller 62 supplies the playback part of the playback point P indicated by the time data received by the communicator 120 on the time axis of the sound signal to the sound outputter 130. The sound outputter 130 outputs a sound represented by the playback part supplied from the playback controller 62, of the sound signal, as in the second embodiment.

The vibration controller 64 according to the third embodiment generates a vibration signal according to the playback part corresponding to the playback point P indicated by the time data detected by the detector 91. Specifically, the vibration controller 64 generates as a vibration signal, the playback part of the sound signal that the playback controller 62 supplies to the sound outputter 130, as in the second embodiment. The communicator 120 transmits the vibration signal generated by the vibration controller 64 to the vibration device 30, as in the first embodiment.

As in the second embodiment, the vibration device 30 is equipment that vibrates depending on a sound of a piece of music that corresponds to the playback point P, and includes a casing 310, a communicator 330, and a vibration imparter 350. The vibration device 30 according to the third embodiment is placed on the surface of the record V in a state in which the concave portion 370 formed in the casing 310 is detachably engageable with the engaging portion 81 of the placement portion 280, as in the second embodiment.

The communicator 330 of the third embodiment receives the vibration signal transmitted by the control system 10, as in the second embodiment. The vibration imparter 350 of the third embodiment vibrates the record V (the operator) according to the vibration signal (that is, the playback part), as in the second embodiment. Therefore, the user while operating the record V in contact with the record V can feel the vibration depending on the playback part supplied to the sound outputter 130, as in the second embodiment.

A process performed by the controller 160 of the playback controller 62 in the third embodiment will now be described. The process of FIG. 9 is started in response to an instruction to play a piece of music from the user. The playback controller 62 supplies the playback part of the playback point P indicated by the time data detected by the operation device 20 in the sound signal to the sound outputter 130, that is, causes the sound outputter 130 to play the sound represented by the playback part in the sound signal (SA2). It is of note that the operation device 20 detects time data in accordance with the rotation of the placement portion 280 or the operation made to the record V. The vibration controller 64 generates a vibration signal from the playback part that the playback controller 62 has supplied to the sound outputter 130 in step SA2 (SA3), as in the second embodiment. When the process of step SA3 ends, the process of step SA2 repeats. It is of note that the process in FIG. 9 ends when an instruction to stop playing the piece of music is received from the user or when the playback ends at the end of the piece of music.

In the third embodiment, the same effects as those of the second embodiment are realized. In the third embodiment, in particular, it is possible to vibrate the record V by using a series of time data recorded on the record V. On the other hand, according to the second embodiment, in which the record V vibrates depending on the playback part detected by the detector 91 in the sound signal recorded on the record V, it is possible to vibrate the operator by using the sound signal recorded on the record V.

Fourth Embodiment

The vibration controller 64 of the first embodiment generates, as a vibration signal, a playback part of the sound signal that the playback controller 62 supplies to the sound outputter 130. In contrast, a vibration controller 64 according to the fourth embodiment generates a vibration signal obtained by adjusting a signal intensity of the playback part of the sound signal that a playback controller 62 supplies to a sound outputter 130.

The playback controller 62 according to the fourth embodiment supplies the playback part of the sound signal to the sound outputter 130, as in the first embodiment. The vibration controller 64 of the fourth embodiment adjusts the signal intensity of the playback part when the signal intensity of the playback part exceeds a predetermined threshold. Specifically, the vibration controller 64 generates a vibration signal obtained by compressing a portion in which the signal intensity exceeds a threshold in the playback part. For compression of the playback part, audio processing, such as compressor processing or the like, can be freely adopted. It is of note that the vibration controller 64 generates the playback part as a vibration signal in a case where the signal intensity of the playback part is lower than the threshold. The predetermined threshold is set to, for example, a predetermined value that allows the user to adequately perceive the vibration while preventing the vibration of the vibration device 30 from becoming excessively large. The threshold may be changed, for example, in response to an instruction made by the user.

A communicator 120 according to the fourth embodiment transmits a vibration signal generated by the vibration controller 64 to a vibration device 30, as in the first embodiment. The vibration device 30 (a vibration imparter 350) vibrates the operator 230 in accordance with the vibration signal transmitted from the control system 10 (that is, in accordance with the playback part), as in the first embodiment.

In the fourth embodiment, the same effects as those of the first embodiment are realized. In order to increase the volume of the sound output from the sound outputter 130, the signal intensity of the playback part that the playback controller 62 supplies to the sound outputter 130 is increased (that is, the amplitude is increased), and a resultant playback part is supplied to the sound outputter 130. If the configuration of the first embodiment is employed, the signal intensity of the vibration signal generated by the vibration controller 64 also increases. In this case, however, a problem arises in that the vibration of the operator 230 becomes excessively large if the signal intensity of the vibration signal increases excessively. In contrast, in the fourth embodiment, a vibration signal representative of the playback part is generated such that the signal intensity of the vibration signal is compressed partially, where the compressed part of the signal corresponds to a part of which a signal intensity exceeds the threshold. Therefore, it is possible to prevent excessive increase in the vibration of the operator 230 when the volume of the sound output from the sound outputter 130 is increased. However, according to the configuration of the first embodiment in which the playback part of the sound signal is generated as the vibration signal, special signal processing for generating the vibration signal such as in the fourth embodiment is unnecessary. Thus, the process of generating the vibration signal is simplified compared to the configuration of the fourth embodiment. Further, in the first embodiment, the vibration of the operator 230 can more appropriately represent the sound played by the sound outputter 130. It is of note that the fourth embodiment may be applied to the second embodiment and the third embodiment.

Fifth Embodiment

In the playback system 1 of the first embodiment, essentially, the sound represented by the playback part of the sound signal is heard by a user from the sound outputter 130. However, in the first embodiment, since the playback part supplied to the sound outputter 130 is also supplied as the vibration signal to the vibration device 30, the sound represented by the playback part can also be heard from the vibration device 30. Accordingly, in the fifth embodiment, it is made less easy for a user to hear the sound from the vibration device 30 compared to the first embodiment.

A playback controller 62 according to the fifth embodiment supplies the playback part of the sound signal to the sound outputter 130, as in the first embodiment. A vibration controller 64 generates a vibration signal from the sound signal the playback part that the playback controller 62 supplies to a sound outputter 130. The vibration controller 64 according to the fifth embodiment generates a vibration signal obtained by adjusting frequency characteristics of the sound signal (playback part). Specifically, the vibration controller 64 generates a vibration signal in which high frequency components have been suppressed in the playback part. In order to suppress the high frequency components, a low pass filter that selects a band component below a cutoff frequency in the playback part is used.

A communicator 120 according to the fifth embodiment transmits the vibration signal generated by the vibration controller 64 to a vibration device 30, as in the first embodiment. The vibration device 30 (a vibration imparter 350) vibrates an operator 230 in accordance with the vibration signal (that is, in accordance with the playback part) transmitted from the control system 10, as in the first embodiment.

In the fifth embodiment, the same effects as those of the first embodiment are realized. In the fifth embodiment, in particular, a vibration signal in which high frequency components have been suppressed in the playback part is generated. Therefore, it is made less easy for a user to hear a sound of high frequency components from the vibration device 30, to which the vibration signal is supplied. It is of note that the fifth embodiment may be applied to the second embodiment and the third embodiment.

Sixth Embodiment

In the first to fifth embodiments, there is described a configuration in which the vibration device 30 is placed on the operator 230. In the sixth to eighth embodiments, a vibration device 30 (a vibration imparter) is mounted in an operation device 20. A configuration of a control system 10 is the same as those of the first to fifth embodiments.

Figure 10:
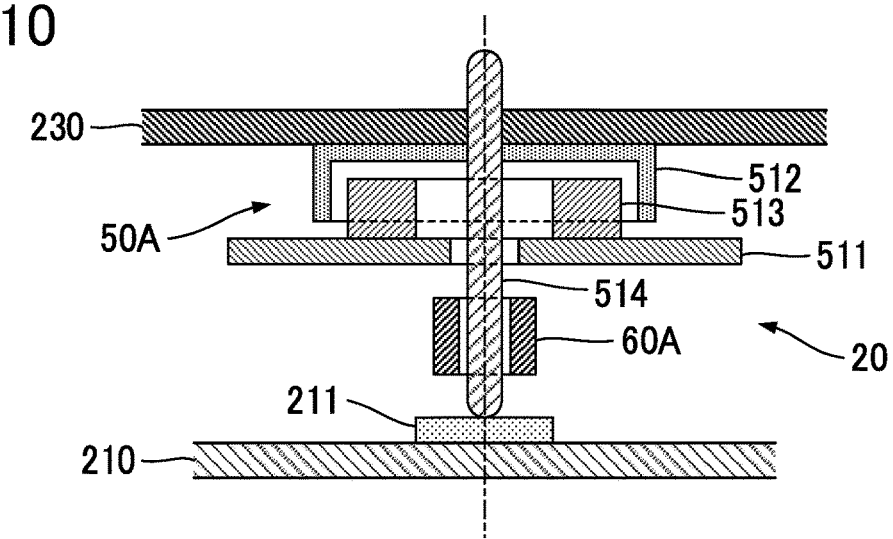
FIG. 10 is a cross-sectional view illustrating a configuration of an operation device in a sixth embodiment.

FIG. 10 is a cross-sectional view illustrating a configuration of an operation device 20 in the sixth embodiment. The operation device 20 of the sixth embodiment includes a casing 210, an operator 230, a drive mechanism 50A, and a vibration imparter 60A, as shown by FIG. 10. The casing 210 is a hollow structure that supports the operator 230, and accommodates the drive mechanism 50A and the vibration imparter 60A.

The drive mechanism 50A rotates the operator 230 at a constant angular velocity. The vibration imparter 60A vibrates the operator 230. A vibration controller 64 according to the sixth embodiment outputs to the vibration imparter 60A a vibration signal depending on the playback part of the sound signal, with the playback part corresponding to the playback point P. The vibration imparter 60A vibrates the operator 230 according to the vibration signal supplied from the vibration controller 64.

As shown in FIG. 10, the drive mechanism 50A of the sixth embodiment includes a wiring substrate 511, a permanent magnet 512, a coil 513, and a rotation shaft 514. The rotation shaft 514 protrudes vertically from the back surface of the operator 230. The wiring substrate 511 is a substrate that has a wiring pattern formed on its surface. The coil 513 is arranged on the surface of the wiring substrate 511. The permanent magnet 512 is an annular magnetic body fixed to the back surface of the operator 230. The rotation shaft 514 is rotated by a mutual action between a magnetic field generated in the coil 513 due to a current supplied through the wiring substrate 511 and a magnetic field of the permanent magnet 512. It is of note that a detector (not shown) that detects the rotation of the operator 230 is arranged in the wiring substrate 511. The detector (pickup) is, for example, a rotary encoder.

The vibration imparter 60A of the sixth embodiment is a solenoid. A vibration signal output from the vibration controller 64 is supplied to the vibration imparter 60A. The vibration imparter 60A vibrates the rotation shaft 514 in an axial direction in accordance with the vibration signal supplied from the vibration controller 64. That is, the vibration imparter 60A vibrates the operator 230 in accordance with the vibration signal. It is of note that a shock absorber (cushion) 211 to reduce impact due to collision of the rotation shaft 514 is arranged between the rotation shaft 514 and the bottom of the casing 210.

Seventh Embodiment

Figure 11:
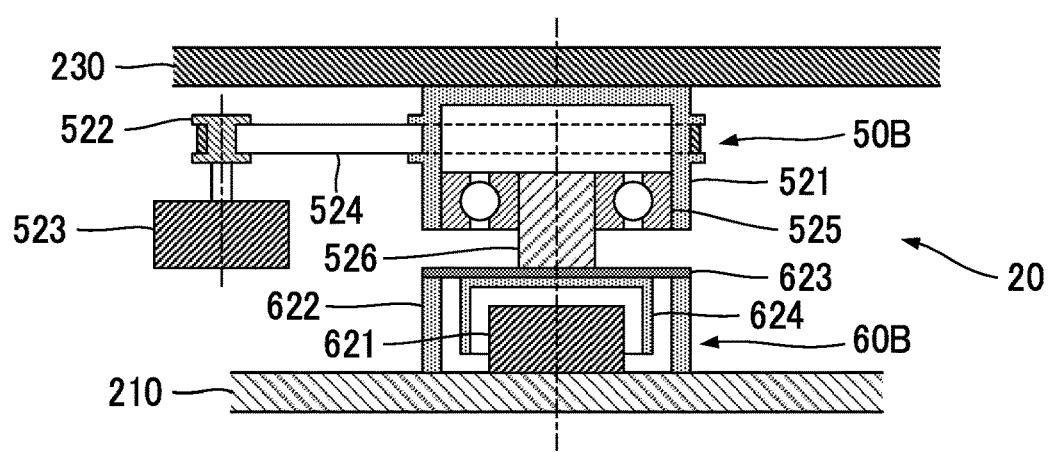
FIG. 11 is a cross-sectional view illustrating a configuration of an operation device in a seventh embodiment.

FIG. 11 is a cross-sectional view illustrating a configuration of an operation device 20 in a seventh embodiment. As shown in FIG. 11, the operation device 20 according to the seventh embodiment includes a casing 210, an operator 230, a drive mechanism 50B, and a vibration imparter 60B. The casing 210 supports the operator 230. The drive mechanism 50B and the vibration imparter 60B are accommodated in the casing 210.

The drive mechanism 50B according to the seventh embodiment includes a rotation body 521, a pulley 522, a motor 523, an endless belt 524, a ball bearing 525, and a rotation shaft 526. The motor 523 rotates the pulley 522. The rotation body 521 is a cylindrical structure mounted to the back surface of the operator 230. The outer circumferential surface of the ball bearing 525 is bonded to the inner circumferential surface of the rotation body 521. The inner circumferential surface of the ball bearing 525 is bonded to the outer circumferential surface of the rotation shaft 526. That is, the rotation body 521 is pivotally supported by the rotation shaft 526 via the ball bearing 525. The endless belt 524 is arranged across between the rotation body 521 and the pulley 522. By use of the above configuration, the rotation body 521 rotates in conjunction with the pulley 522 at a constant angular velocity.

Figure 12:
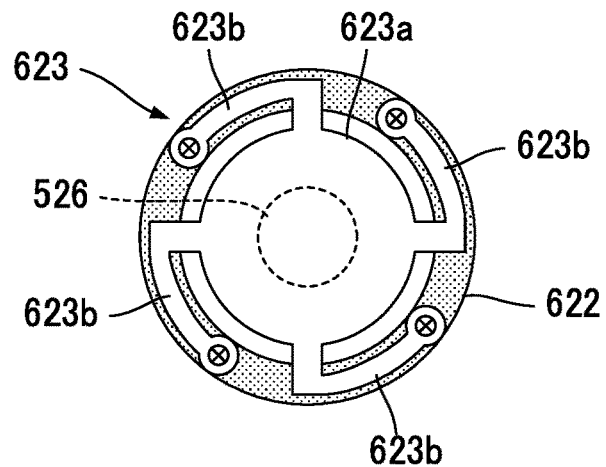
FIG. 12 is a plan view of a base portion and a vibrator in a seventh embodiment.

The vibration imparter 60B of the seventh embodiment includes a permanent magnet 621, a base portion 622, a vibrator 623, and a coil 624. The base portion 622 is a sidewall-shaped structure disposed around the permanent magnet 621. The vibrator 623 supports the rotation shaft 526. FIG. 12 is a plan view of the base portion 622 and the vibrator 623. As shown in FIG. 12, the vibrator 623 is a planar plate-like member in which a support plate 623a and elastic bodies (four in the example of FIG. 12) 623b are formed as a single body. Each elastic body 623b is a leaf spring that can be elastically deformed. One end of each elastic body 623b is fixed to the upper surface of the base portion 622, and the other end is connected continuously to the support plate 623a. The rotation shaft 526 is fixed to the surface of the support plate 623a.

The coil 624 is fixed to a surface of the support plate 623a on the side opposing the rotation shaft 526. The coil 624 is arranged between the permanent magnet 621 and the base portion 622. The vibration signal output from the vibration controller 64 is supplied to the coil 624. The rotation shaft 526 vibrates in an axial direction due to a mutual action between the magnetic field generated in the coil 624 through supply of the vibration signal and the magnetic field of the permanent magnet 621. That is, the vibration imparter 60B vibrates the operator 230 according to the vibration signal.

Eighth Embodiment

Figure 13:
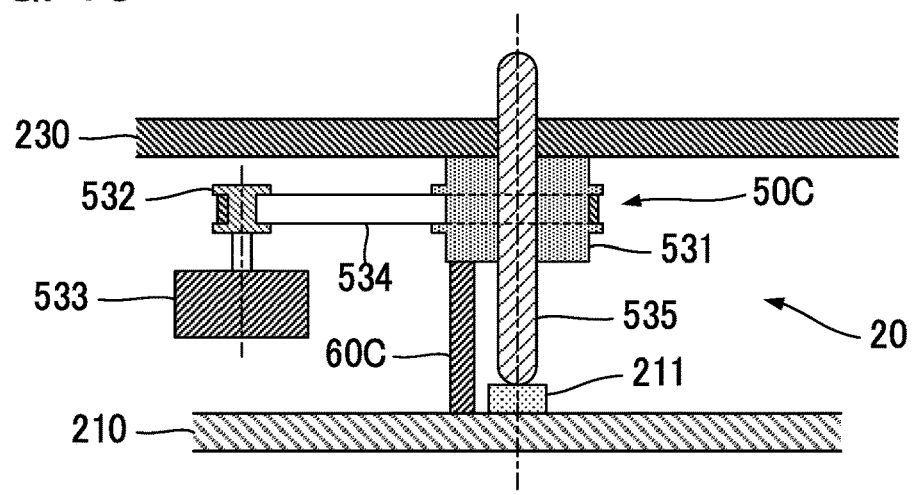
FIG. 13 is a cross-sectional view illustrating a configuration of an operation device in an eighth embodiment.

FIG. 13 is a cross-sectional view illustrating a configuration of an operation device 20 in an eighth embodiment. As shown in FIG. 13, the operation device 20 according to the eighth embodiment includes a casing 210, an operator 230, a drive mechanism 50C, and a vibration imparter 60C.

The casing 210 supports the operator 230. The drive mechanism 50C and the vibration imparter 60C are accommodated in the casing 210.

The drive mechanism 50C according to the eighth embodiment includes a rotation body 531, a pulley 532, a motor 533, an endless belt 534, and a rotation shaft 535. The motor 533 rotates the pulley 532. The rotation body 531 is a cylindrical structure fixed onto the back surface of the operator 230. The rotation shaft 535 vertically protrudes from a surface of the rotation body 531 that is opposite to the operator 230. The endless belt 534 is arranged across between the rotation body 531 and the pulley 532. By use of the above configuration, the rotation body 531 rotates at a constant angular velocity in conjunction with the pulley 532. It is of note that a shock absorber (cushion) 211 that reduces impact due to collision of the rotation shaft 535 is provided between the rotation shaft 535 and the bottom of the casing 210.

The vibration imparter 60C of the eighth embodiment is a vibration actuator disposed between a bottom portion of the casing 210 and the rotation body 531. For example, a piezoelectric actuator or an electromagnetic actuator is used as the vibration imparter 60C. The vibration signal output from the vibration controller 64 is supplied to the vibration imparter 60C. The vibration imparter 60C expands and contracts in accordance with the vibration signal. Therefore, the vibration imparter 60C vibrates the operator 230 in accordance with the vibration signal.

Ninth Embodiment

Figure 14:
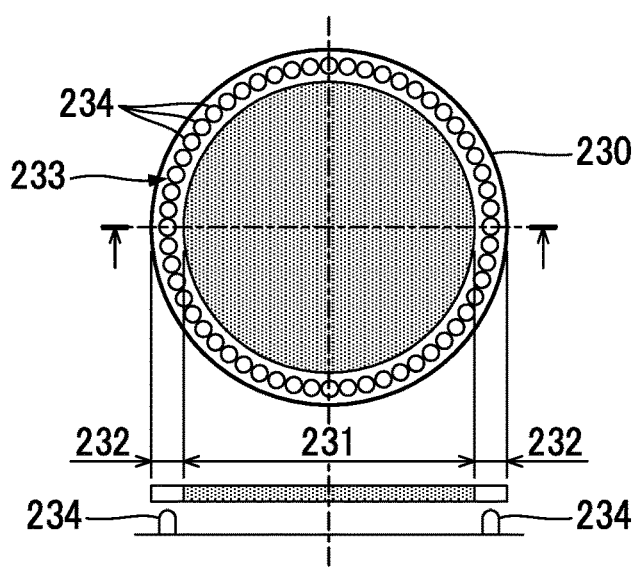
FIG. 14 is a partial plan view and a cross-sectional view each of an operation device in a ninth embodiment.

FIG. 14 is a plan view of an operator 230 in a ninth embodiment. The operator 230 according to the ninth embodiment includes a light shielding portion 231 and a light transmission portion 232. The light shielding portion 231 is a disk-shaped portion formed of a light shielding material. The light transmission portion 232 is an annular portion surrounding the light shielding portion 231. The light transmission portion 232 is a scattering plate formed of a material with a light transmission property.

As shown in FIG. 14, a light emitter 233 is disposed along the rim of the operator 230. The light emitter 233 includes light emitting elements 234. For example, a light emitting diode of which a light emission amount and light emission color are variable may be used as a light emitting element 234. The light emitting elements 234 provided in opposing relation to the light transmission portion 232 of the operator 230. Accordingly, the user is able to visually recognize the light output from each light emitting element 234 and transmitted through the light transmission portion 232.

The controller 160 according to the ninth embodiment causes the light emitter 233 to output light according to the sound played by the sound outputter 130. Specifically, a light emission amount and a light emission color of each light emitting element 234 are controlled according to audio characteristics of the playback sound output from the sound outputter 130. For example, the controller 160 controls the light emission amount and the light emission color according to the volume of the playback sound by the sound outputter 130. The control of the light emission amount also includes control of switching from one of light emission and extinguishment to the other. For example, a large number of light emitting elements 234 light up when the volume of the playback sound is large. According to the above configuration, an advantage is obtained in that the user can perceive the playback sound by the sound outputter 130 not only aurally and tactually but also visually.

A way in which the light emitter 233 emits light may be freely selected and is not limited to the above illustration. Specifically, when the volume of the playback sound by the sound outputter 130 is decreased to zero, the light emitting elements 234 may sequentially output light in an order arranged along the circumference of the operator 230. That is, a light emitting position in the light emitter 233 moves in the circumferential direction of the operator 230. In the configuration including the detector 91, by moving the light emitting position in the circumferential direction of the operator 230, with the position of the detector 91 as a start point, a visual effect can be realized as if sound was output from the detector 91.

Figure 15:
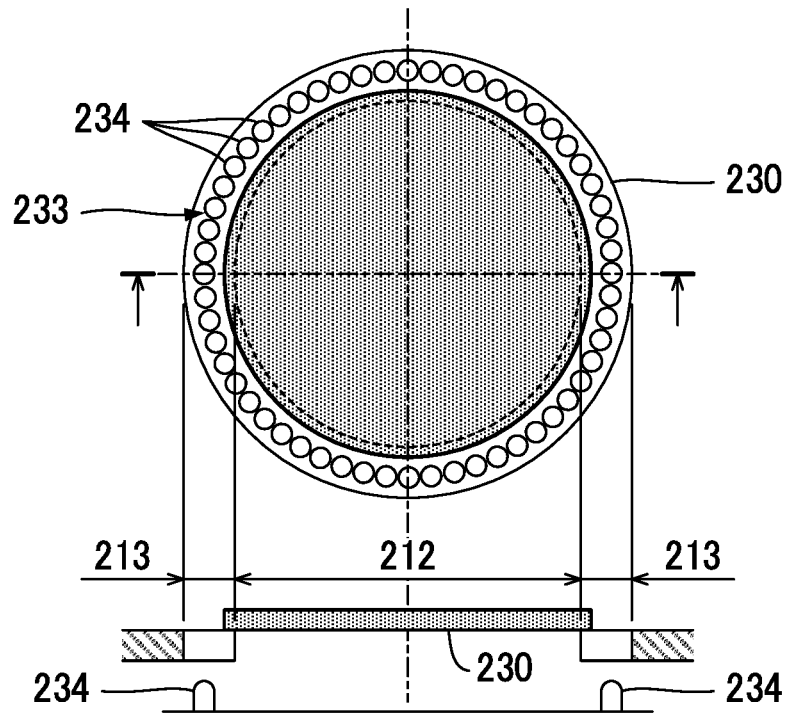
FIG. 15 is a partial plan view and a cross-sectional view each of an operation device according to a modification example of the ninth embodiment.

It is of note that the light emitter 233 is provided in opposing relation to the light transmission portion 232 of the operator 230 in FIG. 14, but a positional relationship between the operator 230 and the light emitter 233 is not limited to the above example. For example, as shown in FIG. 15, in an alternative configuration in which a circular opening portion 212 corresponding to the operator 230 is formed in the casing 210, a light transmission portion 213 with a light transmission property may be installed on the inner circumferential rim of the opening portion 212. The light emitter 233 that includes the light emitting elements 234 is provided in opposing relation to the light transmission portion 213 of the casing 210. In each configuration shown in FIG. 14 or FIG. 15, the light transmission portion is disposed along the rim of the operator 230.

Modifications

Each aspect illustrated above is variously modified. Specific modifications are illustrated below. Two or more modes freely selected from the following modifications may be appropriately combined so long as such combination does not give rise to any contradiction.

Figure 16:
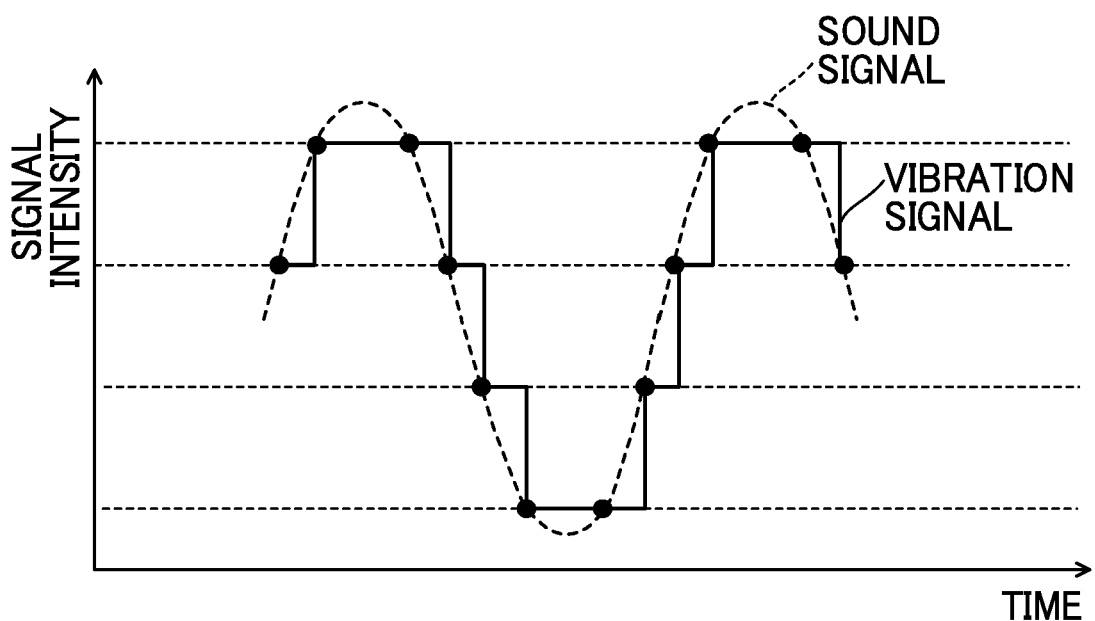
FIG. 16 is an illustrative diagram of a vibration signal according to the modification example.

(1) In the fourth embodiment, the vibration controller 64 generates a vibration signal obtained by compressing a portion in which the signal intensity exceeds a threshold in the playback part, but the process of adjusting the signal intensity of the playback part is not limited to the above example. For example, a vibration signal in which the playback part has been adjusted to one of different levels of signal intensity may be generated. Specifically, as shown in FIG. 16, the vibration controller 64 generates a vibration signal having a level close to the signal intensity of the playback part from among the levels set discretely. That is, the vibration signal is generated by quantizing the sound signal. By use of the above configuration, a vibration signal at a level close to the signal intensity of the playback part from among discrete levels is generated.

(2) The fifth embodiment illustrates a configuration in which the vibration signal in which the high frequency components have been suppressed in the playback part is generated. However, the process of adjusting the frequency characteristics of the playback part is not limited to the above example. For example, a vibration signal in which low frequency components have been suppressed in the playback part may be generated. A high pass filter that selects a band component higher than a cutoff frequency in the playback part is used for suppression of the low frequency components. By use of the above configuration, it is made less easy for a user to hear low frequency component sound from the vibration device 30.

(3) In the first embodiment, the disk that rotates according to the operation of the user is illustrated as the operator 230, but the operator 230 does not necessarily need to rotate. For example, the operator 230 with a linear movement (for example, vertically or horizontally) may be adopted. Further, the operator 230 does not necessarily need to move. For example, the operator 230 may be an operator including a built-in sensor that detects an operation of the user onto the surface of the operator 230. In this case, for example, a disk having a built-in sensor or a touch panel integrally formed with a display may be employed as the operator 230. However, by use of a type of the operator 230 that rotates according to the operation of the user, the user can change the playback point P through a rotating operation. Accordingly, it is possible to maintain a style of natural DJ play that is in widespread use.

(4) In each of the above-described embodiments, the vibration imparter 350 (the vibration device 30) is placed on a surface of the operator 230. However, as long as the operator 230 vibrates, a place at which the vibration imparter 350 is provided may be freely selected. For example, the vibration imparter 350 may be provided on the surface of the casing 210 of the operation device 20, or the vibration imparter 350 may be accommodated in the casing 210 of the operation device 20. However, according to each of the above-described embodiments in which the vibration imparter 350 is provided on the surface of the operator 230, an advantage is obtained in that vibration is easily transmitted to the operator 230.

(5) In each of the embodiments described above, the vibration imparter 350 and the communicator 330 are accommodated in the casing 310. However, the casing 310 need not necessarily be provided in the vibration device 30. For example, in the first embodiment, a configuration in which the vibration imparter 350 and the communicator 330 are mounted inside the operator 230 may also be adopted. In the second and third embodiments, the vibration imparter 350 and the communicator 330 may be mounted inside the placement portion 280. That is, the vibration imparter 350 and the communicator 330 may made integral with the operation device 20. With the above configuration, the casing 310 does not necessarily need to accommodate the vibration imparter 350. By use of the configuration in which the vibration imparter 350 and the communicator 330 are integrated with the operation device 20, an advantage is obtained in that the playback system 1 can be simplified. It is of note that, in the configuration in which the vibration imparter 350 is made integral with the operation device 20, the vibration device 30 can use the communicator 270 of the operation device 20, and thus the communicator 330 may be omitted from the vibration device 30.

(6) The control system 10 and the operation device 20 are separate devices in each embodiment described above. However, the control system 10 may be made integral with the operation device 20. For example, the control system 10 and the operation device 20 may be provided in a portable terminal device such as a smartphone or a tablet terminal. In the above configuration, for example, a touch panel that detects a touch on the display can be suitably adopted as the operator 230, with the vibration device 30 provided on the surface of the display. Further, the control system 10, the operation device 20, and the vibration device 30 may be made integral by using a vibrator built in the above-described portable terminal device as the vibration device 30.

(7) In the first embodiment, the engaging portion may be formed on the surface of the operator 230. A specific form of the engaging portion may be freely selected. For example, a convex or concave engaging portion may be formed on the surface of the operator 230 (for example, at the center of the surface). A convex portion or a concave portion that engages with the engaging portion of the operator 230 is formed on the bottom surface of the casing 310 of the vibration device 30, and thus the engaging portion of the operator 230 engages with the casing 310. In the configuration in which the engaging portion is formed on the surface of the operator 230, the vibration imparter 350 (the vibration device 30) can be readily mounted on the operator 230. When the casing 310 and the engaging portion of the operator 230 are engaged, the vibration device 30 may be made detachable from the operator 230.

(8) In the second and third embodiments, the vibration device 30 (the vibration imparter 350) is placed on the surface of the operator 230, with the engaging portion 81 being engaged with the casing 310 accommodating the vibration imparter 350, where the engaging portion 81 is inserted in the central hole 33 of the record V and is formed at the center of the surface of the placement portion 280. However, the vibration imparter 350 may be provided on the surface of the operator 230 in a freely-selected manner, which is not limited to the above example. For example, the vibration imparter 350 may be provided on the surface of the operator 230 such that the vibration imparter 350 is not engaged with the engaging portion 81 inserted into the central hole 33 of the record V.

(9) Although in each of the above-described embodiments the vibration device 30 starts to vibrate with the start of the playback of a piece of music, the vibration of the vibration device 30 may be turned on or off according to an instruction from the user made to the inputter 150. The instruction to turn on or off the vibration of the vibration device 30 can be made not only before the start of a piece of music playback but also during the playback of a piece of music. Further, the vibration device 30 may be vibrated only when an operation is made to the operator 230. Further, the sound output of a piece of music may be turned on or off (silenced) according to an instruction input from the user made to the inputter 150. When the sound output of a piece of music is turned off, there is no sound output of the piece of music, but the vibration device 30 vibrates depending on the playback part.

(10) The vibration controller 64 of the fourth embodiment adjusts the signal intensity of the playback part supplied to the sound outputter 130 in the sound signal, to generate the vibration signal. However, the vibration signal may be generated from the sound signal in which the signal intensity has been adjusted in advance (for example, a sound signal of which a signal intensity is lower than a threshold at all time points on the time axis). Specifically, the vibration controller 64 generates a vibration signal depending on the playback point P on the time axis of the sound signal, of which the signal intensity has been adjusted in advance. It is of note that the storage device 110 stores a sound signal of which a signal intensity has been adjusted and a sound signal of which a signal intensity has not been adjusted. The playback controller 62 supplies the playback part of the sound signal of which a signal intensity is adjusted to the sound outputter 130. In the above configuration, since no adjustment needs to be performed to the signal intensity of the playback part during playback of a piece of music, a processing load on the control system 10 is reduced. In the fifth embodiment also, it is possible to generate the vibration signal from a sound signal of which a frequency characteristic has been adjusted in like manner.

(11) In each of the embodiments described above, the vibration device 30 including the cylindrical casing 310, the communicator 330, and the vibration imparter 350 is illustrated, but a specific form of the vibration device 30 may freely employed. For example, any form of vibration device 30 such as a hand-worn type (for example, a finger-sack type or a glove type) provided on a hand of a user may be adopted. Further, the vibration device 30 including the disk-shaped casing 310, the communicator 330, and the vibration imparter 350 (for example, a configuration in which the communicator 330 and the vibration imparter 350 are built in a slip mat) may be adopted. In the above configuration, for example, in the second and third embodiments in which the record V is the operator 230, the vibration device 30 may be provided between the record V and the placement portion 280.

(12) The playback controller 62 supplies the playback part of the sound signal to the sound outputter 130 in each of the above-described embodiments. However, the playback controller 62 may perform audio processing, such as a compressor process, in the playback part, to supply the resultant playback part to the sound outputter 130. In the above configuration, the vibration controller 64 generates a vibration signal depending on the playback part that the playback controller 62 supplies to the sound outputter 130. However, the playback controller 62 may generate a vibration control signal depending on the playback part, on which audio processing has not yet been performed.

(13) The control system 10 illustrated in each of the above-described embodiments is preferably realized by the controller 160 working under coordination of the computer program as described above. This computer program is provided in a form stored in a computer-readable recording medium and installed in the computer. The recording medium is, for example, a non-transitory recording medium, and an optical recording medium (an optical disc) such as a CD-ROM is an example, but may include any known type of recording medium such as a semiconductor recording medium or a magnetic recording medium. It is of note that the non-transitory recording medium may include any recording medium other than a transitory propagation signal, and a volatile recording medium is not excluded. Further, the computer program may be distributed to the computer via a communication network. Further, the computer program illustrated above may be distributed to the computer via a communication network and installed on the computer.

(14) In each of the above-described embodiments, the sound outputter 130 outputs the sound represented by the playback part of the sound signal and the operator 230 vibrates in accordance with the vibration signal corresponding to the playback part, but the sound output from the sound outputter 130 is not limited to the sound represented by the sound signal. For example, the present disclosure is also applicable to a sampler that causes the sound outputter 130 to play a sound corresponding to an operation made to the operator 230 among a plurality of types of sounds (for example, different musical performance sounds of different types of musical instruments). For example, the operator 230 includes operators corresponding to different sounds. The playback controller 62 causes the sound outputter 130 to output a sound corresponding to, from among the operators, an operator operated by the user. Further, the vibration controller 64 vibrates the operator 230 by supplying to the vibration imparter the vibration signal depending on the sound to be output by the sound outputter 130. As will be understood from the above example, the playback system according to an aspect of the present disclosure includes a playback controller that causes a sound outputter to play a sound in accordance with an operation made to an operator operated by a user while the user is in contact with the operator; and a vibration imparter that vibrates the operator in accordance with a vibration signal corresponding to the sound.

(15) The following configurations, for example, are derivable from the embodiments illustrated above.

A playback system according to an aspect (a first aspect) of the present disclosure includes a playback controller that causes a sound outputter to play a sound in accordance with an operation made by a user to an operator that is operated while the user is in contact with the operator; and a vibration imparter that vibrates the operator in accordance with a vibration signal that corresponds to the sound. According to the above aspect, it is possible for the user to tactually sense the playback sound of the sound outputter.

In an example (a second aspect) of the first aspect, the playback controller causes the sound outputter to play a sound represented by a part, within a sound signal, corresponding to a playback point that changes depending on the operation made to the operator, and the vibration imparter vibrates the operator in accordance with the vibration signal that accords with the part of the sound signal corresponding to the playback point. In the above aspect, the operator vibrates depending on the playback part corresponding to the playback point that changes depending on the operation made to the operator operated while the user is in contact with the operator. Therefore, it is possible for the user to tactually sense the sound indicated by the playback part of the sound signal, where the playback part corresponds to the playback point P. It is of note that, by use of the configuration in which the operator rotates in accordance with an operation of the user, a natural DJ play style that is in widespread use can be maintained.

The playback system according to an example (a third aspect) of the second aspect further includes a casing that supports the operator, and the vibration imparter is accommodated in the casing. According to the above aspect, since the vibration imparter is accommodated in the casing, an advantage is obtained in that handling of the playback system is easy, as compared with a configuration in which the vibration imparter is prepared separately from the casing.

In an example (a fourth aspect) of the second aspect, the vibration imparter is placed on the operator. According to the above aspect, the vibration imparter is prepared separately from the operator and is placed on the operator. Therefore, an advantage is obtained in that the vibration imparter can be placed at any position on the operator. Further, by use of the configuration in which an engaging part is formed in a convex shape or a concave shape on the surface of the operator, it is even easier for the vibration imparter to be mounted on the operator.

The playback system according to an example (a fifth aspect) of the fourth aspect further includes: an engaging portion formed on a surface of the operator; and a casing that accommodates the vibration imparter, where the casing engages with the engaging portion. In the above configuration, the engaging portion formed on the surface of the operator engages with the vibrator that accommodates the vibration imparter. Therefore, it is easy to provide the vibration imparter on the operator.

In an example (a sixth aspect) of the second to the fifth aspects, the operator is a disk-shaped member that rotates in accordance with the operation made by the user, and the operator includes a light emitter that is disposed along a rim of the operator and outputs light depending on the sound played by the sound outputter. According to the above aspect, an advantage is obtained in that the user can sense the sound played by the sound outputter not only aurally and tactilely but also visually.

In the playback system according to an example (a seventh aspect) of any one of the second to sixth aspects, the operator is a record, and the system further includes a placement portion on which the operator is placed, and the placement portion rotates the operator. In the above configuration, the placement portion rotates with the record placed thereon as the operator. Therefore, a DJ play style that involves handling the record can be maintained. The playback system according to an example of the seventh aspect includes a convex engaging portion formed at a center of a surface of the placement portion, and a casing that accommodates the vibration imparter, where the engaging portion is inserted into a centrally located hole in the record, and the casing is detachably engageable with the engaging portion. In the above configuration, since the convex engaging portion formed at the center of the surface of the placement portion and inserted into the centrally located hole of the record engages with the casing accommodating the vibration imparter, the convex engaging portion to be inserted into the centrally located hole of the record can be used for mounting the casing that accommodates the vibration imparter. Further, it is easy to mount the vibration imparter (the casing) to the placement portion.

The playback system according to an example (an eighth aspect) of the seventh aspect further includes a detector that detects within the sound signal the part corresponding to the playback point, from the record on which the sound signal has been recorded, and the playback controller causes the sound outputter to play a sound of the part detected by the detector within the sound signal, and the vibration imparter vibrates the operator depending on the part detected by the detector within the sound signal. In the above configuration, the operator vibrates in accordance with the playback part detected by the detector, of the sound signal recorded on the record. Therefore, it is possible to vibrate the record by using the sound signal recorded on the record.

A playback system according to an example (a ninth aspect) of the seventh aspect further includes a detector that detects, from the record on which a series of time data has been recorded, a piece of time data indicating the playback point, the playback controller causes the sound outputter to play the sound represented by the part within the sound signal corresponding to the playback point which is indicated by the piece of time data detected by the detector, and the vibration imparter vibrates the operator depending on the part within the sound signal corresponding to the playback point indicated by the piece of time data detected by the detector. In the above configuration, the operator vibrates depending on within the sound signal the playback part corresponding to the playback point indicated by the time data detected from the record. Therefore, it is possible to vibrate the record using the time data recorded on the record.

The playback system according to an example (a tenth aspect) of any one of the second to ninth aspects further includes a vibration controller that generates the vibration signal depending on the part within the sound signal corresponding to the playback point.

In an example of the tenth aspect (an eleventh aspect), the vibration controller generates the vibration signal by adjusting a signal intensity of the part within the sound signal corresponding to the playback point. In the eleventh aspect, the vibration controller generates the vibration signal by adjusting a signal intensity of the part within the sound signal corresponding to the playback point. Further, in an example of the eleventh aspect, the vibration controller generates a vibration signal in which a portion has been compressed of which a signal intensity exceeds a threshold in the part within the sound signal corresponding to the playback point. By use of the above configuration, it is possible to restrain an excessive increase in the signal intensity of the vibration signal.

In an example (a twelfth aspect) of the tenth aspect, the vibration controller generates the vibration signal by adjusting frequency characteristics of the part corresponding to the playback point. In an example of the twelfth aspect, the vibration controller generates a vibration signal in which high frequency components have been suppressed in the part within the sound signal corresponding to the playback point. Further, in an example of the twelfth aspect, the vibration controller generates a vibration signal in which low frequency components have been suppressed in the part within the sound signal corresponding to the playback point.

A vibrator according to an aspect (a thirteenth aspect) of the present disclosure includes a communicator that receives a vibration signal that accords with a part within a sound signal corresponding to a playback point that changes in accordance with an operation made to an operator, wherein the operator is operated by a user while the user is in contact with the operator; and a vibration imparter that vibrates the operator in accordance with the vibration signal received by the communicator. According to the above aspect, it is possible for the user to tactually sense the sound indicated by the playback part of the sound signal corresponding to the playback point.

A playback system control method according to an aspect (a fourteenth aspect) of the present disclosure includes causing a sound outputter to play a sound in accordance with an operation made by a user to an operator that is operated while the user is in contact with the operator; and vibrating the operator in accordance with a vibration signal that corresponds to the sound. According to the above aspect, it is possible for the user to tactually sense the playback sound of the sound outputter.

In the control method according to an example (a fifteenth aspect) of the fourteenth aspect, causing the sound outputter to play a sound includes causing the sound outputter to play a sound represented by a part within a sound signal corresponding to a playback point that changes depending on the operation made to the operator, and vibrating the operator includes vibrating the operator according to the vibration signal that accords with the part within the sound signal corresponding to the playback point. According to the above aspect, it is possible for the user to tactually sense the sound indicated by the playback part of the sound signal corresponding to the playback point.

DESCRIPTION OF REFERENCE SIGNS

1 Playback system
10 Control system
110 Storage device
120 Communicator
130 Sound outputter
140 Display
150 Inputter
160 Controller
20 Operation device
210 Casing
230 Operator
231 Light shielding portion
232, 213 Light transmission portion
233 Light emitter
234 Light emitting element
250 Operation detector
270 Communicator
280 Placement portion 290 Detection device
50A, 50B, 50C Drive mechanism
91 Detector
93 Supporter
30 Vibration device
310 Casing
330 Communicator
350, 60A, 60B, 60C Vibration imparter
370 Concave portion
62 Playback controller
64 Vibration controller
81 Engaging portion
33 Central hole

What is claimed is:

1. A playback system comprising:
an operator;
a shaft disposed at a center axis of an operator so that the operator is rotatable;
a rotation body attached to the undersurface of the operator and rotatably supported by the shaft,
a memory storing instructions; and
at least one processor that implements the instructions to cause a sound outputter to play sound representing part of a sound signal, the part corresponding to a playback point that changes depending on an operation made by the user to the operator, which is rotatable by the user in contact with the operator; and
a vibration imparter that vibrates the shaft in accordance with a vibration signal corresponding to the part of the sound signal to impart vibration to the operator,
wherein the vibration imparter comprises:
a permanent magnet;
a base structure disposed surrounding the permanent magnet;
a coil arranged between the permanent magnet and the base structure and configured to receive supply of the vibration signal; and
a vibratory plate that includes an elastically deformable part and is fixed to the upper end portion of the base structure,
wherein the vibratory plate is fixed to the shaft,
wherein, in a state where the vibration signal is supplied, the shaft is configured to vibrate axially due to a mutual action between a magnetic field generated by the coil and a magnetic field of the permanent magnet.

2. The playback system according to claim 1, wherein:
the operating member comprises a disk-shaped member, and
the disk-shaped member includes a light emitter that is disposed along a rim thereof and outputs light depending on the sound played by the sound outputter.

3. The playback system according to claim 1, wherein:
the operating member comprises a disk-shaped record, and
the rotation body comprises a placement portion on which the disk-shaped record is placed,
wherein the shaft rotates the placement portion, which rotates the disk-shaped record.

4. The playback system according to claim 3, further comprising:
a detector that detects the part of the sound signal corresponding to the playback point, from the disk-shaped record, on which the sound signal has been recorded,
wherein the at least one processor causes the sound outputter to play sound of the part detected by the detector, and
wherein the vibration imparter vibrates the shaft to impart vibration to the disk-shaped record depending on the part detected by the detector.

5. The playback system according to claim 3, further comprising:
a detector that detects, from the disk-shaped record, on which a series of time data has been recorded, a piece of time data indicating the playback point,
wherein the processor causes the sound outputter to play the sound represented by the part of the sound signal corresponding to the playback point, which is indicated by the piece of time data detected by the detector, and
wherein the vibration imparter vibrates the shaft to impart vibration to the to the disk-shaped record depending on the part of the sound signal corresponding to the playback point indicated by the piece of time data detected by the detector.

6. The playback system according to claim 1, wherein the operator comprises a disk-shaped member.

7. The playback system according to claim 6, wherein:
the rotation body comprises a cylindrical rotation body attached to the undersurface of the disk-shaped member,
the cylindrical rotation body is disposed above the vibratory plate.

8. The playback system according to claim 1, wherein:
the operator comprises a disk-shaped member, and
the rotation body is attached to the undersurface of the disk-shaped member and rotatably supported by the shaft.

* * * * *